United States Patent
Born et al.

(10) Patent No.: US 12,350,657 B2
(45) Date of Patent: Jul. 8, 2025

(54) PRECIOUS METAL GRID FOR CATALYZING GAS PHASE REACTIONS

(71) Applicant: UMICORE AG & CO. KG, Hanau-Wolfgang (DE)

(72) Inventors: Dirk Born, Langenselbold (DE); Artur Wiser, Frankfurt (DE); Stefan Zeuner, Bad Homburg v.d.H. (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 456 days.

(21) Appl. No.: 17/996,045

(22) PCT Filed: Apr. 22, 2021

(86) PCT No.: PCT/EP2021/060547
§ 371 (c)(1),
(2) Date: Oct. 12, 2022

(87) PCT Pub. No.: WO2021/214232
PCT Pub. Date: Oct. 28, 2021

(65) Prior Publication Data
US 2023/0226534 A1    Jul. 20, 2023

(30) Foreign Application Priority Data

Apr. 22, 2020   (EP) ..................... 20170800

(51) Int. Cl.
| | |
|---|---|
| *B01J 35/06* | (2006.01) |
| *B01J 23/46* | (2006.01) |
| *B01J 35/00* | (2024.01) |
| *B01J 35/30* | (2024.01) |
| *B01J 35/58* | (2024.01) |
| *B01J 37/00* | (2006.01) |
| *C01B 21/26* | (2006.01) |

(52) U.S. Cl.
CPC ............ *B01J 35/58* (2024.01); *B01J 23/464* (2013.01); *B01J 35/19* (2024.01); *B01J 35/396* (2024.01); *B01J 37/0009* (2013.01); *C01B 21/265* (2013.01)

(58) Field of Classification Search
CPC . B01J 35/58; B01J 35/19; B01J 35/396; B01J 23/464; B01J 37/009; C01B 21/265
See application file for complete search history.

(56) References Cited

U.S. PATENT DOCUMENTS 5,232,891 A * 8/1993 Hormann .............. C01C 3/0233
502/331

FOREIGN PATENT DOCUMENTS

| DE | 4206199 C1 | 11/1992 |
|---|---|---|
| DE | 4028916 C2 | 5/1994 |
| EP | 0 259 966 A1 | 3/1988 |
| EP | 0 364 153 B1 | 3/1992 |
| EP | 0 474 972 A1 | 3/1992 |

OTHER PUBLICATIONS

Holleman, A.F., et al. Lehrbuch der Anorganischen Chemie, [Textbook of Inorganic Chemistry]. Walter de Gruyter. 1995. p. 1195-1198.
International Preliminary Report on Patentability dated Oct. 25, 2022 for International Patent Application No. PCT/EP2021/060547 (5 pages in German with English Translation).
International Search Report dated Jul. 15, 2021 for International Patent Application No. PCT/EP2021/060547 (4 pages in German with English translation).
Written Opinion of the International Searching Authority dated Jul. 15, 2021 for International Patent Application No. PCT/EP2021/060547 (4 pages in German).
European Search Report mailed Oct. 29, 2020 for European Patent Application No. 20170800.5 (7 pages in German with English translation).
Franz Sperner, et al. Rhodium-Platinum Gauzes for Ammonia Oxidation. Platinum Metals Review. 1976. vol. 20, No. 1, pp. 12-20.
Oliver Henkes. Contaminants and their effect on catalytic gauze performance in nitric acid plants. Nitrogen+Syngas 2019 International Conference & Exhibition. Berlin. 2019. pp. 291-295.
A.P.v. Rosenstiel, et al. ESCA, SIMS, SEM and XRD investigations of Pt-10%Rh catalyst-gauzes. Fresenius Z Anal Chem. 1989. vol. 333, pp. 535-539.
Dennis R. Anderson. Catalytic Etching of Platinum Alloy Gauzes. Journal of Catalysis. 1988. vol. 113, pp. 475-489.
G. R. Maxwell. Chapter 9, Nitric Acid. Synthetic Nitrogen Products—A Practical Guide to the Products and Processes. Springer Science + Business Media, Inc. 2005, pp. 213-250.
Andreas Jess, et al. Chemical Technology. Wiley-VCH Verlag, Weinheim. 2013. pp. 568-583.

* cited by examiner

*Primary Examiner* — Yong L Chu
(74) *Attorney, Agent, or Firm* — Smith, Gambrell & Russell, LLP

(57) ABSTRACT

The invention relates to a wire made of platinum group metals for producing grid catalysts comprising platinum and rhodium. The invention is characterized in that the wire is made as a sheathed wire and consists of a core and one or more sheaths arranged one over the other outwards from the core in a radially symmetrical manner, and the rhodium concentration in the outermost sheath is lower than the rhodium concentration in the sheath or core arranged directly under the outermost sheath.

12 Claims, 2 Drawing Sheets

PRECIOUS METAL GRID FOR CATALYZING GAS PHASE REACTIONS

Precious-metal-catalyzed gas reactions, such as the oxidation of ammonia with atmospheric oxygen in nitric acid production (Ostwald process) or the reaction of ammonia with methane in the presence of oxygen to give hydrocyanic acid (Andrussow process) have long been considered extremely important from an industrial perspective; after all, they provide base chemicals for the chemical industry and for fertilizer production on a large industrial scale (Andreas Jess, Peter Wasserscheid: Chemical Technology (Wiley-VCH Verlag, Weinheim 2013) Chapter 6.4.)

At the center of these heterogeneously catalyzed gas reactions are precious metal catalysts in the form of gas-permeable spatial structures, on or in which the reaction takes place. Here, grids in the form of woven textiles (DE4028916 C2) or weft-knitted textiles (EP0364153 B1, DE4206199 C1) made of fine precious metal wires have been established for some time now.

The catalyst grids are typically arranged in a flow reactor in a plane perpendicular to the flow direction of the gas mixture. Conical arrangements are also known. A plurality of grids are expediently arranged one after the other and combined into a catalyst grid stack.

Figure 1:
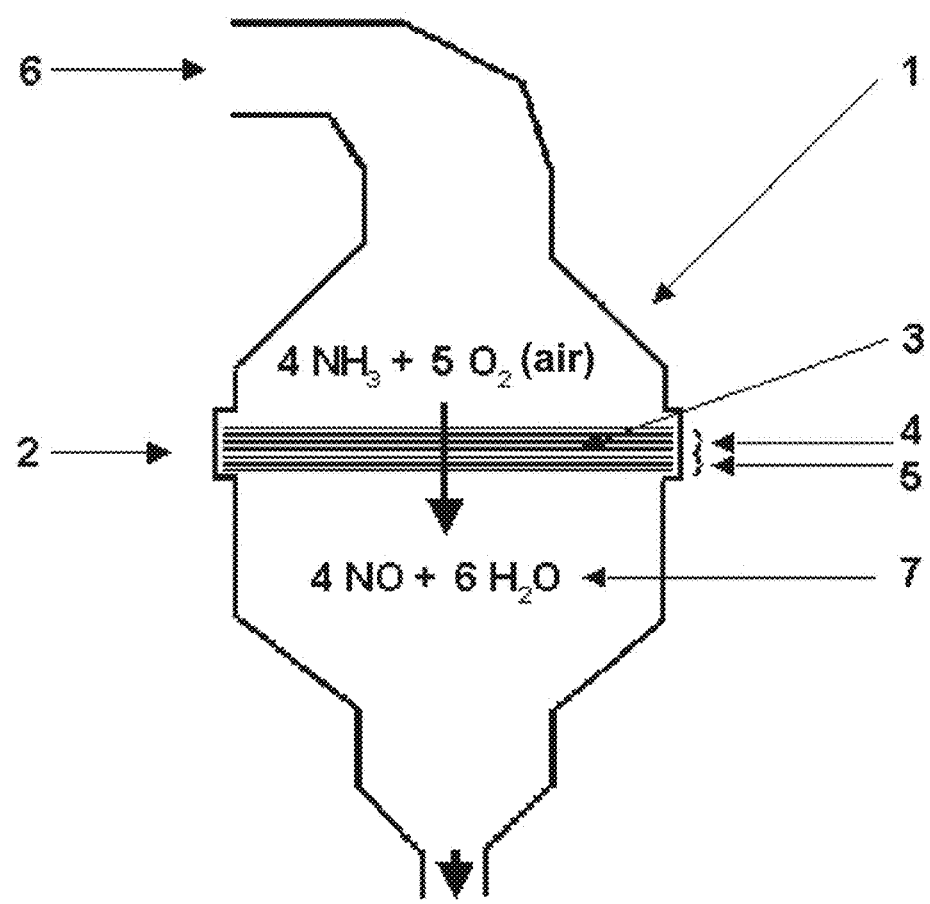

FIG. 1 schematically shows the reactor with the grid stack installed therein, whose function is described below, in an example of catalytic ammonia oxidation (Ostwald process):

In the reaction zone (2) of the flow reactor (1), the grid stack (3), which consists of a plurality of catalyst grids (4) arranged one after the other and of downstream separating and getter grids (5), is arranged in a plane perpendicular to the flow direction. This grid stack is held in its position by clamping.

The reaction gas (ammonia-atmospheric oxygen mixture having an ammonia content of 9-13 vol. %) (6) flows through the grid stack (3) at atmospheric or increased pressure, wherein ignition of the gas mixture takes place in the inlet region and the combustion reaction giving nitrogen monoxide (NO) and water encompasses the entire reaction zone (2):

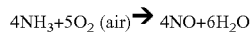
$4NH_3 + 5O_2 \text{ (air)} \rightarrow 4NO + 6H_2O$

Undesired side reactions are the oxidation of the ammonia to nitrogen and nitrous oxide ($N_2O$).

The NO in the outflowing reaction gas mixture subsequently reacts with excess atmospheric oxygen to give $NO_2$:

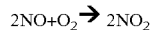
$2NO + O_2 \rightarrow 2NO_2$

An undesired side reaction here is the formation of nitrous oxide:

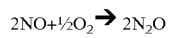
$2NO + \frac{1}{2}O_2 \rightarrow 2N_2O$

The $NO_2$ in turn reacts in a downstream absorption with water to give nitric acid, which is routed, for example, to fertilizer production:

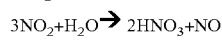
$3NO_2 + H_2O \rightarrow 2HNO_3 + NO$

Homogeneous precious metal wires made of platinum, rhodium or of alloys of said metals with other precious or non-precious metals are currently used for the production of the grids. Platinum-rhodium or platinum-palladium-rhodium alloys having 88 to 97 wt % platinum are typical here. Platinum is required to achieve the highest possible ammonia conversion, rhodium improves the selectivity to NO, thereby reducing the emission of nitrous oxide, and increases the mechanical strength [G. R. Maxwell: "Synthetic Nitrogen Products—A Practical Guide to the Products and Processes", Springer Science+Business Media, Inc. 2005, page 220]. In turn, palladium is used, depending on precious metal prices, to reduce the precious metal costs by replacing platinum.

During the first operating hours, a restructuring of the surface takes place; the catalyst is "activated". In particular, cracks and a cauliflower-like structure form which, due to the high surface area, also increase activity [Oliver Henkes: "Contaminants and their effect on catalytic gauze performance in nitric acid plants", Nitrogen+Syngas 2019 International Conference & Exhibition (Berlin Mar. 4-7, 2019].

Rhodium on the wire surface oxidizes to rhodium oxide, further rhodium diffuses out of the interior of the wire. Some of the rhodium oxide forms needle-shaped structures, which reduce the catalyst's selectivity to $NO_2$ and thus lead to higher nitrous oxide formation. Furthermore, the needles hinder the formation of the cauliflower-like surface [D2] and thus reduce the activity of the catalyst. Rhodium oxide is thermodynamically stable below a certain temperature [D1]. For this reason, the reactor is heated as quickly as possible above the minimum operating temperature $T_{min}$ at which rhodium oxide is no longer thermodynamically stable. However, the rhodium oxide needles that are formed on the wire surface during start-up break down only very slowly, even at high temperatures.

$T_{min}$ is a function of the partial pressure of oxygen and the rhodium concentration. The higher the partial pressure of oxygen and the rhodium concentration, the higher $T_{min}$. Therefore, with higher rhodium concentrations the reactor temperature must also be increased. This in turn increases the erosion of precious metal from the platinum grids; an increase in the reactor temperature from 820° C. to 920° C. causes a tenfold increase in the erosion of precious metal [Franz Sperner, Wolfgang Hohmann: "Rhodium-Platinum Gauzes for Ammonia Oxidation", Platinum Metals Review (1976) 20 (1) 12-20].

For the above reasons, below $T_{min}$ a low rhodium content in the surface is desirable to minimize the formation of rhodium needles. In turn, above $T_{min}$ a higher rhodium concentration of approx. 5 to 10 wt % is desirable since, in this range, the rhodium oxide is thermodynamically unstable, and to increase selectivity to NO.

Moreover, since rhodium is subject to higher price fluctuations than platinum and is usually much more expensive, the rhodium concentration of the wire is a compromise.

It is therefore an object of the present invention to provide a wire for producing grid catalysts, which exhibits minimized rhodium enrichment and rhodium needle formation on the surface during the heating-up phase and offers good activity and selectivity to ammonia oxidation above $T_{min}$. In addition, the precious metal costs should be kept as low as possible.

The object is achieved by a wire consisting of platinum group metals for producing grid catalysts, containing at least platinum and rhodium, characterized in that the wire is made as a sheath wire and consists of a core and a sheath or a plurality of sheaths arranged one over the other outwards from the core in a radially symmetrical manner, and the rhodium concentration in the outermost sheath is lower than the rhodium concentration in the sheath or core arranged directly under the outermost sheath.

The group of platinum group metals consists of the metals Ru, Rh, Pd, Os, Ir, and Pt [A. F. Holleman, E. Wiberg: Lehrbuch der Anorganischen Chemie, Walter de Gruyter, Berlin 1995; page 1197].

The lower concentration of rhodium in the outermost sheath of said wire structure reduces the rhodium needle formation and the rhodium concentration in the wire surface during the start-up phase of the reactor. By diffusing rhodium from the sheath or core arranged thereunder, the necessary rhodium concentration is then achieved in the surface of the wire. For this reason, it is important that the outermost sheath is not too thick. Therefore, a sheath thickness of 1 µm to 10 µm, preferably of 1 µm to 5 µm, is used. The wire has overall a total diameter of 50 µm to 150 µm.

Where ranges are mentioned in this document, the range limits are considered to be included.

The rhodium concentration in the outermost sheath is 1 wt % to 3 wt %, preferably 2 wt % to 3 wt %, in particular 2.5 wt % to 3 wt %, and the rhodium concentration in the sheath or core arranged under the outermost sheath is in the range of 5 wt % to 20 wt %, preferably in the range of 8 wt % to 12 wt %, in particular 9 wt % to 11 wt %. A rhodium concentration of 3 wt % in the outermost sheath and 10 wt % in the sheath or core arranged under the outermost sheath has proven particularly successful. With a rhodium concentration in the outermost sheath of more than 3 wt %, the above-described effect of rhodium enrichment and rhodium needle formation on the surface increases again during the heating-up phase; with a rhodium concentration of less than 1 wt %, the workability is no longer given since the tensile strength of the material decreases. In addition, a rhodium-free outermost sheath would lead to a high selectivity to $N_2O$ during the heating-up phase, rendering a small proportion of rhodium necessary.

In the simplest case, the wire can also consist only of a core and a sheath. The advantage thereof is simpler production. However, in this case, the entire core has to have a higher rhodium concentration than in the sheath, which, depending on the market price of rhodium, can significantly increase the precious metal costs.

For cost reasons, a preferred variant has a core and two or more sheaths, wherein the core consists of at least 92 wt %, preferably at least 97 wt % platinum and/or palladium. This reduction in the rhodium content of the core is possible since the rhodium which has to diffuse into the outermost sheath is provided by the sheath which is arranged directly under the outermost sheath. A small proportion of rhodium in the core, preferably less than or equal to 3 wt %, can be used to increase the tensile strength and improve workability.

This wire is used for the production of grid catalysts. This can be done by weaving, warp knitting or weft knitting. Preferably, the grid catalyst is produced by weft knitting.

The preferred method for producing a grid catalyst according to the invention comprises the following steps in the following sequence:

a. Providing a bolt, comprising platinum and/or palladium,
b. Providing a tube or a plurality of tubes, comprising platinum and rhodium, wherein the inner diameter of the thinnest tube is selected such that the thinnest tube can be pushed flush over the bolt, and the diameters of the further tubes are selected such that they can be pushed flush one over the other, and the outermost tube has a lower rhodium concentration than the sheath or core arranged under the outermost tube.

The term "flush" in this invention is intended to convey that the inner diameter of the outer tube is equal to or greater by a selected tolerance than the outer diameter of the bolt or tube over which the outer tube is to be pushed. A typical tolerance in this case is 1 mm to 10 mm.

c. Pushing the tubes and the bolt one over the other, starting with the pushing of the thinnest tube over the bolt, after which the tubes are pushed on successively with increasing diameter, and connecting the bolt to the tube or tubes, for example on the tube puller, thereby creating a blank
d. Annealing and subsequently cold-rolling the blank; this step can be repeated several times
e. Wire-drawing the blank to the desired wire thickness
f. Weft-knitting the catalyst grid from the wire Several sheaths of the same composition can also be used under the outermost sheath. This may be necessary in order to facilitate the workability since the forming of the tubes for the sheath becomes more difficult or even impossible from a certain wall thickness.

Furthermore, a method for the oxidation of ammonia is part of the invention, in which method one or more catalyst grids according to the invention are used.

Example 1

A bolt made of platinum with a diameter of 8 mm is produced. A first tube having an inner diameter of 10 mm and an outer diameter of 14 mm, consisting of a platinum-rhodium alloy made of 90 wt % platinum and 10 wt % rhodium, is annealed at 1000° C. for 30 min and, after cooling, pushed over the bolt and drawn to an outer diameter of 12 mm (rod A). A second tube having an inner diameter of 18 mm and an outer diameter of 22 mm, consisting of a platinum-rhodium alloy made of 90 wt % platinum and 10 wt % rhodium, is annealed at 1000° C. for 30 min and, after cooling, pushed over rod A (rod B). Over this, a third tube having an inner diameter of 21 mm and an outer diameter of 22.5 mm, consisting of a platinum-rhodium alloy made of 97 wt % platinum and 3 wt % rhodium, is in turn pushed over rod B and drawn to an outer diameter of 17.5 mm. The blank obtained in this manner is first annealed at 1000° C. for 30 min and subsequently cold-rolled to an outer diameter of 9.5 mm and subsequently annealed at 1150° C. for 10 h. Subsequently, the blank is further rolled to an outer diameter of 1.5 mm and then drawn on the wire drawing machine to form a wire having a diameter of 76 µm. The wire thus obtained has an outermost sheath thickness of approx. 3 µm, the middle sheath, consisting of the material of the first and second tube, has a thickness of approximately 10 µm.

Comparative Example

A bolt consisting of a platinum-rhodium alloy made of 95 wt % platinum and 5 wt % rhodium and having a diameter of 32 mm is produced. This blank is first annealed at 1000° C. for 30 min and subsequently cold-rolled. This process is repeated twice. The blank is then drawn on the wire drawing machine to form a wire having a diameter of 76 µm.

Production of the Catalyst Grids

The catalyst grid is obtained from the wire obtained in each case by weft knitting on a flat-bed knitting machine as double jersey knit. Grids having a mass per unit area of 600 $g/m^2$ and a diameter of 32 mm are produced for the laboratory tests.

The catalyst grids are named according to the wire used in each case.

Measurement of the Catalyst Grids

The catalyst grids in example 1 and the comparative example were measured as a grid stack of 8 identical grids in a laboratory reactor having a 30 mm inner diameter. In this case, a volume flow of 1140 standard liters/h at a pressure of 405000 Pa was set. The $NH_3$ content was 10.53 vol. %; the remainder of the gas consisted of air.

Figure 2:
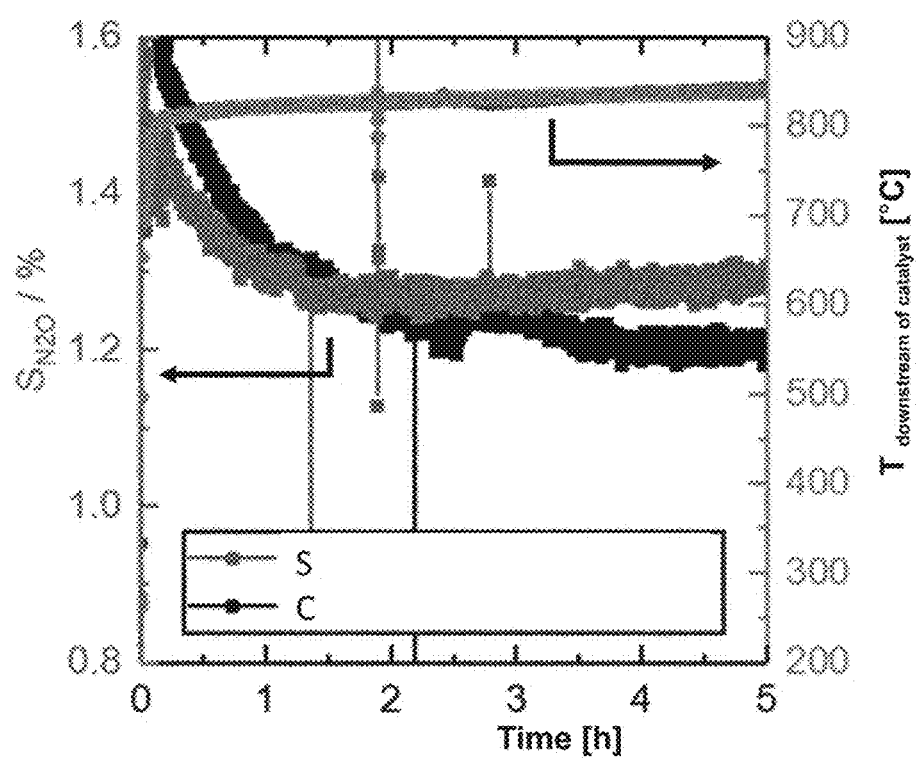

FIG. 2 shows the results. In this case, S denotes the results measured with the "comparative example" catalyst grid, C denotes the results measured with the "example 1" catalyst grid.

The selectivity to nitrous oxide $N_2O$ (left ordinate) is shown over time (abscissa). In addition, the temperature profile is provided (right ordinate), which was the same for both measurements.

As can be seen, C (example 1) has a slightly higher selectivity to $N_2O$ up to approx. 2 h. Thereafter, the selectivity of C falls below that of S (comparative example).

The inventors interpret the result as follows:

Example 1 has only a rhodium concentration of 3 wt % on the surface, which significantly reduces the formation of rhodium oxide needles during heating-up compared to the comparative example with 5 wt % rhodium, but slightly increases the selectivity to $N_2O$. After a short run time above the minimum operating temperature $T_{min}$=800° C., the rhodium concentration in the outermost sheath increases by diffusing rhodium from the lower sheath to above 5 wt % rhodium in the surface, which significantly reduces the selectivity of the catalyst grid to $N_2O$.

Here, example 1 consists only of 2.59 wt % rhodium and thus requires less rhodium than the comparative example with 5 wt % rhodium. This can additionally reduce the precious metal costs, depending on the price of rhodium and platinum.

The invention claimed is:

1. A wire consisting of platinum group metals for producing grid catalysts containing at least platinum and rhodium, wherein the wire is made as a sheath wire and consists of a core and one or more sheaths arranged one over the other outwards from the core in a radially symmetrical manner, and the rhodium concentration in the outermost sheath is lower than the rhodium concentration in the
   core, if the sheath wire only consists of a core and a sheath, or
   sheath, if the sheath wire consists of a core and two or more sheaths,
   arranged directly under the outermost sheath, and the rhodium concentration in the outermost sheath is 1 wt % to 3 wt %, and the rhodium concentration in the sheath or core arranged under the outermost sheath is in the range of 5 wt % to 20 wt %, and the thickness of the outermost sheath is 1 μm to 10 μm.

2. The wire according to claim 1, wherein the wire consists of a core and a sheath.

3. The wire according to claim 1, wherein the sheath wire consists of a core and two or more sheaths arranged one over the other outwards from the core in a radially symmetrical manner, and the core consists of at least 92 wt % platinum and/or palladium.

4. A grid catalyst for catalyzing gas phase reactions, wherein the grid catalyst comprises a mesh containing a wire according to claim 1.

5. The grid catalyst according to claim 4, wherein the mesh of the grid catalyst is weft-knitted.

6. A method for producing a grid catalyst according to claim 4, comprising the steps of:
   a. providing a bolt, comprising platinum and/or palladium,
   b. providing a tube or a plurality of tubes, comprising platinum and rhodium, wherein the inner diameter of the thinnest tube is selected such that the thinnest tube can be pushed flush over the bolt, and the diameters of the further tubes are selected such that they can be pushed flush one over the other, and the outermost tube has a lower rhodium concentration than the sheath or core arranged under the outermost tube
   c. pushing the tubes and the bolt one over the other, starting with the pushing of the thinnest tube over the bolt, after which the tubes are pushed on successively with increasing diameter, and connecting the bolt to the tube or tubes thereby creating a blank
   d. annealing and subsequently cold-rolling the blank; this step can be repeated several times
   e. wire-drawing the blank to the desired wire thickness
   f. weft-knitting the catalyst grid from the wire.

7. The method according to claim 6, wherein the bolt is connected (method step b) to the tube or to the tubes by means of a tube puller.

8. A method for oxidizing ammonia, wherein the oxidation is catalyzed by at least one catalyst grid according to claim 4.

9. The wire according to claim 1, wherein the rhodium concentration in the sheath or core arranged under the outermost sheath is in the range of 8 wt % to 12 wt %.

10. The wire according to claim 9, wherein the thickness of the outermost sheath is 1 μm to 5 μm.

11. The wire according to claim 1, wherein the thickness of the outermost sheath is 1 μm to 5 μm.

12. The wire according to claim 3, wherein the core consists of at least 97 wt % platinum and/or palladium.

* * * * *